Sept. 8, 1953 W. CALL 2,651,089
BINDER FOR LINK CHAINS
Filed Sept. 4, 1951 2 Sheets-Sheet 1

INVENTOR.
Wilson Call
BY *[signature]*
ATTORNEYS

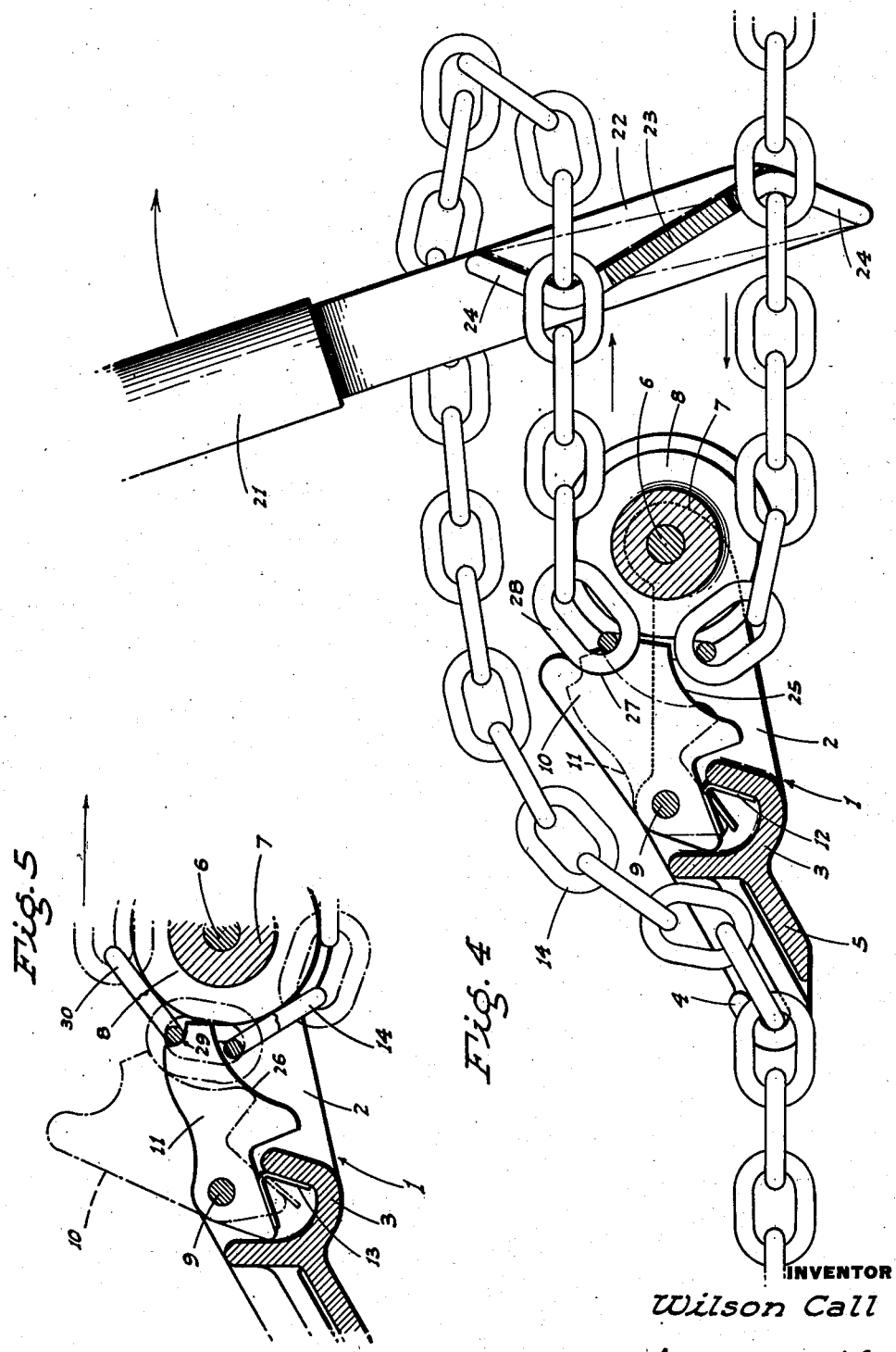

Patented Sept. 8, 1953

2,651,089

UNITED STATES PATENT OFFICE 2,651,089

BINDER FOR LINK CHAINS

Wilson Call, Oildale, Calif.

Application September 4, 1951, Serial No. 245,027

2 Claims. (Cl. 24—116)

This invention is directed to, and it is a major object to provide, a novel binder or tensioning device for link chains; the invention representing a modification of the chain binder shown in United States Patent No. 2,621,020, dated December 9, 1952.

Another important object of the present invention is to provide a binder for link chains which is effective to lock a chain under relatively great tension; this being accomplished by virtue of the fact that the chain can be adjusted or tightened within the limit of one chain link length.

A further object of the invention is to provide a binder for link chains, as in the preceding paragraph, wherein such effective tensioning is accomplished and maintained through the medium of a novel locking dog assembly; such assembly including locking dogs for cooperation alternately with the flatwise links and edgewise links of the chain, whereby the chain can be releasably locked in the device within the limit of one chain length, as aforesaid.

An additional object of the invention is to provide a binder for link chains which is capable of ready manipulation for the tensioning of a chain, which manipulation is aided by a pinch bar of unique design.

It is also an object of the invention to provide a binder for link chains which is sturdy and rugged, yet being relatively simple in structure and designed for ease and economy of manufacture.

Still another object of the invention is to provide a practical and reliable binder for link chains, and one which will be exceedingly effective for the purpose for which it is designed.

These objects are accomplished by means of such structure and relative arrangement of parts as will fully appear by a perusal of the following specification and claims.

In the drawings:

Fig. 4 is an enlarged side elevation, mainly in section, showing the device as in use; the central locking dog being in play, and the pinch bar being illustrated in its position of engagement with the chain.

Fig. 5 is a similar but fragmentary view showing one of the outside locking dogs as in play.

Figure 1:
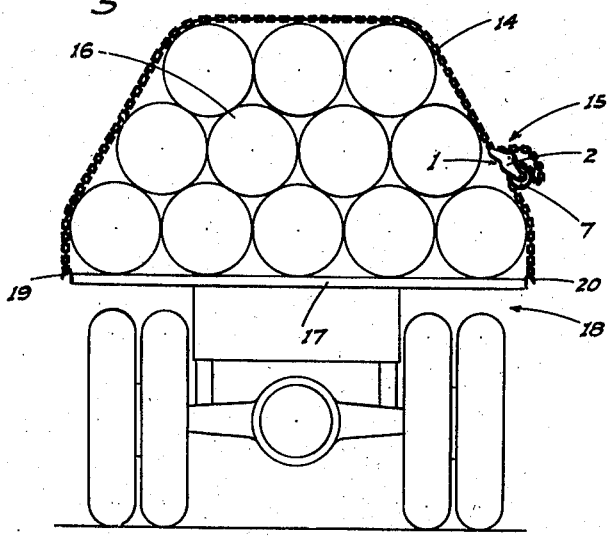
Fig. 1 is a somewhat diagrammatic rear end elevation of a truck showing a load retained thereon by a chain tensioned with one of the present devices.
Figure 3:
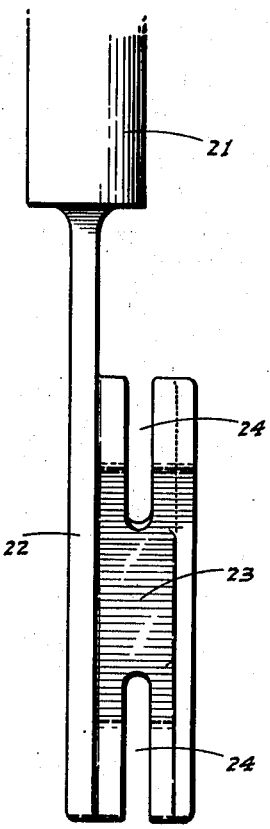
Fig. 3 is a fragmentary elevation showing the lower end portion of the pinch bar which is used to manipulate the chain through the device.
Figure 2:
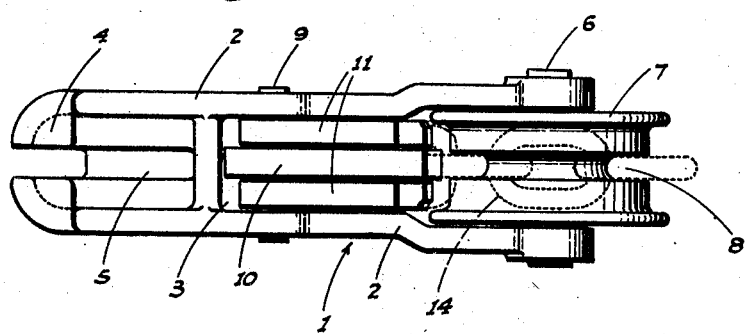
Fig. 2 is a top plan view of the device.

Referring now more particularly to the characters of reference on the drawings, the improved binder or tensioning device for link chains comprises an elongated, heavy-duty body 1 open from top to bottom in the forward portion and including sides 2 connected at the rearward portion in integral relation by a transverse U-shaped body section 3.

Rearwardly of the transverse body section 3, the body includes a longitudinally slotted hook 4, and the hook shank 5 extends in integral relation from said body section 3.

In substantial clearance relation ahead of the body section 3 the sides 2 are connected by a cross pin 6, and a wide-faced roller 7 is journaled on said cross pin; the roller having a relatively deep, circumferential groove centrally therein, such groove being indicated at 8.

Immediately above the transverse U-shaped body section 3 there is a cross pin 9 connecting between the sides 2 of the body, and three side by side locking dogs are pivoted on such cross pin 9 and project forwardly therefrom; the central locking dog being indicated at 10, and each of the outside locking dogs being indicated at 11.

The locking dogs 10 and 11 normally lie generally tangentially of the roller 7, and are of a greater length than the distance from the cross pin 9 to the periphery of the roller 7 on a line extending directly between said cross pin 9 and cross pin 6.

V-shaped leaf springs 12 and 13, engaged at one end in the transverse U-shaped body section 3, and engaged at the other end with rearwardly projecting end portions of the central locking dog 10 and outside locking dogs 11, respectively, urge said dogs toward the roller 7. Thus, all of the dogs are spring-urged toward a working position.

When the device is in use it is interposed in a chain 14 in the manner shown in Fig. 1, and wherein the device is indicated generally at 15. In this embodiment the chain 14 is shown retaining a load 16 on the bed 17 of a truck 18; the chain being hooked at opposite ends, as at 19 and 20, to the sides of the truck bed.

The chain 14 is engaged with the device 15 as follows:

The chain first passes beneath the roller 7 from below, extends upwardly in engagement with the roller through the body 1 between the sides 2, and then runs back contra to the direction of entry. From here a loop of the chain extends over the body 2, and at the end of such loop opposite the roller 7 the chain is engaged with the hook 4; one edgewise link extending through the hook slot, while an adjacent flatwise link is disposed above the shank 5 and abuts into the hook.

The body 1 is thus effectively anchored to one reach of the chain, with the other reach having a portion turned about the roller 7.

A pinch bar 21 is provided for the purpose of tightening the chain, and such pinch bar includes, at its lower end, a flat shank 22 having a laterally projecting chain link engaging web 23 rigidly secured thereon. The web 23 is somewhat S-shaped in side or edge elevation, and is slotted inwardly from opposite ends, as at 24.

The chain 14, at points immediately outwardly of the roller 7, is engaged with the pinch bar by the placement of edgewise links in the slots 24, with adjacent flatwise links abutting into the face of the web 23 in the concavities thereof.

Thereafter, by swinging the pinch bar 21 forcefully by hand in the direction indicated by the arrow, the chain is pulled through the device on the roller 7 in a chain tensioning direction.

As the chain is pulled through the device on the roller 7, the locking dogs 10 and 11 are alternately raised to a clearance position and then spring-returned behind the adjacent end of the edgewise links and the flatwise links, respectively. This occurs by reason of the fact that the inner edges of the central locking dog 10 and outside locking dogs 11 are concave, as at 25 and 26, respectively.

The central locking dog 10 is formed, at its outer end, with a concave notch 27 for engagement in matching and wedging relation with the near end of the immediately adjacent edgewise link 28, while each of the outside locking dogs 11 is formed with a relatively smaller concave notch 29 for engagement in wedging relation with the rear end of each immediately adjacent flatwise link 30.

Upon the chain 14 being turned through the body 2 on the roller 7, the edgewise links 28 ride into the central groove 8, while the flatwise links 30 span such groove and bear against the periphery of the roller 7 on opposite sides.

As the chain 14 is worked by the pinch bar 21 through the body 1, riding on the roller 7 as aforesaid, the edgewise links 28 and flatwise links 30 are engaged, correspondingly and in alternation, by the central locking dog 10 and outside locking dogs 11. Thus, at any moment of release of the pressure on the pinch bar 21, a link of the chain is immediately engaged and wedged against the roller so that tensioning adjustment is accomplished within the limit of one chain length link. This is extremely advantageous as it permits the chain to be closely or accurately tensioned on a load, the described locking dog assembly thereafter being effective to positively but releasably maintain the chain under the set tension.

To release the device, the pinch bar 21 is re-engaged with the chain in the manner described, and manipulated until all of the dogs can be manually released, whereupon the chain is permitted to slip through the device, and slacken.

From the foregoing description it will be readily seen that there has been produced such a device as will substantially fulfill the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A binder, for a link chain, comprising an elongated body having a chain hook at the rear end and a transverse-axis, centrally circumferentially grooved roller journaled in the front end portion of said body between its sides, the body being open therethrough between said sides for a distance rearwardly of the roller, and a plurality of locking dogs pivoted for independent movement on a transverse axis in the body between the sides rearwardly of the roller and projecting toward the latter for alternate wedging engagement with corresponding links of a chain which extends about the roller at the rear with the edgewise links traveling in the roller groove and the flatwise links riding the periphery of the roller; one locking dog being formed and disposed to engage the immediately adjacent edgewise link of the chain, and another dog being formed and disposed to engage the immediately adjacent flatwise link.

2. A binder, for a link chain, comprising an elongated body having a chain hook at the rear end and a transverse-axis, centrally circumferentially grooved roller journaled in the front end portion of said body between its sides, the body being open therethrough between said sides for a distance rearwardly of the roller whereby a chain may extend about said roller at the rear with the edgewise links traveling in the groove and the flatwise links spanning the groove and riding opposite sides of the roller periphery, and three side by side locking dogs pivoted on a transverse axis rearwardly of the roller and projecting toward the latter; said dogs being formed and disposed for wedging engagement of the central dog with the immediately adjacent edgewise link, and wedging engagement of the outside dogs with the immediately adjacent flatwise link when the central dog is disengaged from said edgewise link.

WILSON CALL.

References Cited in the file of this patent

UNITED STATES PATENTS

| Number | Name | Date |
| --- | --- | --- |
| 159,057 | Ackerman | Jan. 26, 1875 |
| 858,240 | Werner | June 25, 1907 |
| 1,181,000 | Gregg | Apr. 25, 1916 |
| 1,488,600 | Hulse | Apr. 1, 1924 |
| 1,537,070 | Dixon | May 12, 1925 |
| 1,963,634 | Stahl et al. | June 19, 1934 |
| 2,014,201 | Field | Sept. 10, 1935 |
| 2,089,679 | Williams | Aug. 10, 1937 |
| 2,165,377 | Henry | July 11, 1939 |
| 2,387,509 | Harris | Oct. 23, 1945 |
| 2,499,753 | Hubbard | Mar. 7, 1950 |